(12) United States Patent
Kennett

(10) Patent No.: US 12,110,132 B2
(45) Date of Patent: Oct. 8, 2024

(54) EXERCISE DEVICE FOR USE IN MICROGRAVITY ENVIRONMENTS

(71) Applicant: HIFI BLACK LIMITED, Teddington (GB)

(72) Inventor: John Kennett, Teddington (GB)

(73) Assignee: HIFI BLACK LIMITED, Teddington (GB)

(*) Notice: Subject to any disclaimer, the term of this patent is extended or adjusted under 35 U.S.C. 154(b) by 301 days.

(21) Appl. No.: 17/597,748

(22) PCT Filed: Jul. 20, 2020

(86) PCT No.: PCT/GB2020/051728
§ 371 (c)(1),
(2) Date: Jan. 21, 2022

(87) PCT Pub. No.: WO2021/014137
PCT Pub. Date: Jan. 28, 2021

(65) Prior Publication Data
US 2022/0267028 A1 Aug. 25, 2022

(30) Foreign Application Priority Data
Jul. 24, 2019 (GB) .................................... 1910554

(51) Int. Cl.
*B64G 1/22* (2006.01)
*A63B 21/00* (2006.01)
(Continued)

(52) U.S. Cl.
CPC ............ *B64G 1/22* (2013.01); *A63B 21/0428* (2013.01); *A63B 21/4007* (2015.10);
(Continued)

(58) Field of Classification Search
CPC .. B64G 1/22; B64G 1/228; B64G 1/60; A63B 21/0428; A63B 21/4007;
(Continued)

(56) References Cited

U.S. PATENT DOCUMENTS 4,706,953 A * 11/1987 Graham ............. A63B 21/4009
482/133
5,098,040 A 3/1992 Retat
(Continued)

FOREIGN PATENT DOCUMENTS

CN 1923320 A 3/2007
DE 202008015674 U1 3/2009

OTHER PUBLICATIONS

International Search Report and Written Opinion for Application No. PCT/GB2020/051728, mailed on Oct. 21, 2020, 14 pages.
(Continued)

*Primary Examiner* — Andrew S Lo
(74) *Attorney, Agent, or Firm* — Husch Blackwell

(57) ABSTRACT

A device including a first member for supporting a user; and a second member 14, attached to the first member, including a counterbalance portion. The first member and the second member are each moveable, and operable to slide with respect to each other in opposite directions, between a first position and a second position. The device can be operable such that between the first and second positions, the combined center of mass of the device 10 and its user remains substantially fixed. This serves to reduce the extent of forces and vibrations generated by use of the device on the object to which the device is located.

23 Claims, 9 Drawing Sheets

(51) Int. Cl.
*A63B 21/04* (2006.01)
*A63B 23/04* (2006.01)
*A63B 24/00* (2006.01)

(52) U.S. Cl.
CPC ...... *A63B 21/4034* (2015.10); *A63B 21/4035* (2015.10); *A63B 23/0405* (2013.01); *A63B 24/0062* (2013.01); *A63B 2220/40* (2013.01); *B64G 1/228* (2023.08)

(58) Field of Classification Search
CPC ............ A63B 21/4034; A63B 21/4035; A63B 23/0405; A63B 24/0062; A63B 2220/40; A63B 23/12; A63B 2023/0411; A63B 2208/0233; A63B 2208/0252; A63B 2220/833; A63B 21/023; A63B 21/0602; A63B 21/0603; A63B 21/0604; A63B 21/0618; A63B 21/151; A63B 21/154; A63B 21/4005; A63B 21/4031; A63B 21/4045; A63B 22/0089; A63B 22/203; A63B 23/03525; A63B 23/03533; A63B 23/1209; A63B 21/00065; A63B 21/02; F16F 7/10; F16F 15/02
See application file for complete search history.

(56) References Cited

U.S. PATENT DOCUMENTS

| | | | |
|---|---|---|---|
| 5,549,285 A | 8/1996 | Collins | |
| 7,125,369 B2* | 10/2006 | Endelman | A63B 22/203 482/121 |
| 7,871,358 B2* | 1/2011 | Graham | A63B 23/0405 482/142 |
| 7,931,570 B2* | 4/2011 | Hoffman | A63B 21/055 482/129 |
| 8,152,699 B1* | 4/2012 | Ma | A61H 1/0229 482/54 |
| 10,792,528 B1* | 10/2020 | Lagree | A63B 21/00065 |
| 10,835,775 B1* | 11/2020 | Lagree | A63B 21/023 |
| 2009/0298655 A1 | 12/2009 | Lacher | |
| 2013/0210593 A1 | 8/2013 | McBride et al. | |
| 2017/0368413 A1* | 12/2017 | Shavit | A63B 24/0075 |
| 2019/0009126 A1* | 1/2019 | Davison | A63B 21/4043 |

OTHER PUBLICATIONS

"International Preliminary Report on Patentability for Application No. PCT/GB2020/051728, mailed on Feb. 3, 2022", 8 pages.

* cited by examiner

EXERCISE DEVICE FOR USE IN MICROGRAVITY ENVIRONMENTS

PRIORITY CLAIM

The present application is a National Phase entry of PCT Application No. PCT/GB2020/051728, filed Jul. 20, 2020, which claims priority from GB Patent Application No. 1910554.3, filed Jul. 24, 2019, each of which is hereby fully incorporated herein by reference.

TECHNICAL FIELD

The present disclosure relates to a device for use in microgravity environments, which can be configured to mitigate forces and vibrations generated in portions of the device from being transmitted from the device to its surroundings.

BACKGROUND

In the context of a vehicle such as an aircraft (including a spacecraft), the transmission of forces and vibrations to the vehicle created by devices contained therein is undesirable. Especially in spacecraft, and microgravity environments, the presence of such forces and vibrations is particularly undesirable.

In the case of exercise devices, existing devices can create large amounts of generated forces and vibrations on its surroundings which, when used in the above vehicles, may be detrimental to the performance and operation of the vehicle.

SUMMARY

It is therefore an object of the present disclosure to provide a device, such as an exercise device, and an assembly comprising such a device, which mitigates any created forces and vibrations from the device being transmitted to its surroundings. A further object of the present disclosure is to provide a vehicle comprising such a device or an assembly.

Aspects of the disclosure are set out in the accompanying claims.

Viewed from a first aspect there is provided a device for use in microgravity environments, the device comprising: a first member for supporting a user; a second member, attached to the first member, comprising a counterbalance portion; wherein the first member and the second member are each moveable, and operable to slide with respect to each other in opposite directions, between a first position and a second position.

The above device is suited for use as an exercise device, where the user rests on their back on the first member, and then applies a force on the device to slide the first and second members cyclically between the first positions and the second positions. Since both the first member and the second member are both moveable, and slide with respect to each other in opposite directions, this helps to neutralize the extent of forces and vibrations exerted by the device on its surroundings during its use.

The device is preferably operable such that between the first and second positions, the combined center of mass of the device and its user remains substantially fixed. In this way, the extent of forces and vibrations exerted by the device can be further reduced.

The mass of the counterbalance portion is variable for balancing the mass of the first member and the user with the mass of the second member. This allows for better control of the combined center of mass for the device and its user such that it can remain fixed during use of the device.

In some embodiments, the first member and the second member are operable to slide with respect to each other about a single axis of movement. In that regard, the first and second members might then only move towards and away from each other along this axis of movement, which may be configured such that it is substantially parallel to the orientation of a user who is laying down on the device when the device is in use.

In some embodiments, the counterbalance portion may comprise a tank containing fluid, such as water. In these embodiments, the tank may be located underneath the second member. In some embodiments, the tank may be for containing at least one solid object. Such embodiments are particularly suited where the device is used in a location where space is at a premium, such as the International Space Station. There, the tank can be used to temporarily store fluid or other solid objects (e.g. moon or Martian rock) which may be needed elsewhere at a later time.

In a more terrestrial application of the device, the counterbalance portion may comprise a rack for storing separate masses. In some embodiments, the counterbalance portion may additionally/alternatively comprise a sheet of material, such as metal, which may be attached to an underside of the second member. Where the counterbalance portion comprises both the rack for storing separate masses and the sheet of material, the rack for storing separate masses may in some embodiments function as a fine tuning mechanism for adjusting the mass of the second member.

The device may comprise at least one rack and pinion for controlling the sliding movement of the first and second members. In some embodiments, the at least one rack and pinion may comprise a plurality of rack and pinion, and in such embodiments there may be one rack and pinion adjacent a first side of the first and second members, and a second rack and pinion adjacent a second side of the first and second members opposite the first side. The function of the rack and pinion is to better control the sliding movement between the first and second members.

In some embodiments, the device further comprises at least one biasing means for biasing the first and second members from the second position towards the first position. In this configuration, the biasing means helps restore the first and second members back towards their first position, and may further provide a resistive force against the force provided by the user to move the first and second members from the first position to the second position. In this way, via appropriate selection of the biasing means, an appropriate resistive force can be generated such to provide the required workout to the user. One particular biasing means which may be used is a spring, such a helical spring. In some embodiments, the biasing means may comprise one or more vacuum cylinders.

In some embodiments, the at least one biasing means may comprise a plurality of biasing means. These biasing means in some embodiments may be distributed across a width of the second member. In that way, the loadings exerted through the device as a whole, and also through the plurality of biasing means, can be more evenly distributed across the device.

To assist with the comfort of the user during use of the device, the first member may comprise a headrest. The headrest may be detachable from the rest of the first member.

To better align the user on the device, such to also better ensure the distribution of forces through the device, the first member may comprises at least one shoulder pad. In such embodiments, each shoulder pad may be moveable between a plurality of different positions with respect to the rest of the first member. The provision of such a moveable shoulder pad allows the device to be better set up for users of different heights.

In some embodiments, the first member may comprise at least one handle for gripping by the user. In such embodiments, each handle may be moveable to a plurality of different positions with respect to the rest of the first member. With such a handle(s), the user can better secure themselves during use of the device.

In some embodiments the second member comprises a footplate. The footplate is preferably configured to act as a surface from which the user can push against during use of the device to push the first and second members toward the second position. In some embodiments, the footplate may extend in a direction that is substantially perpendicular to the first and second members. In that way, the forces exerted on the footplate by the user are substantially parallel to the direction of motion of the first and second members between the first and second positions. To reduce the space taken up by the device when it is not in use, and to allow the device to be more easily used by a user when in a seated position, in some embodiments the footplate may be moveable between an erected position and a collapsed position.

In some embodiments, the device further comprises at least one sensor. Each such sensor(s) in some embodiments may be used to generate information concerning a property of the device, or the user which is using the device. In some embodiments, the property may comprise a stress, strain, velocity, acceleration, position, or angle. Exemplary sensors include, but are not limited to, at least one of an accelerometer, a strain gauge, a pressure sensor or an optical sensor.

In some embodiments, the device may further comprise at least one bracket attached to the device, wherein each bracket comprises a rope receiving means, wherein each bracket is moveable between a first stowed position in which the bracket is located between the first and second members, and a second erected position where the bracket extends out from between the first and second members. In some particular embodiments, each bracket may be configured to move between the first stowed position and the second erected position by a rotational movement and a sliding movement. In some configurations, the at least one bracket comprises two brackets—i.e. one bracket for each arm of the user.

In some embodiments, which may be particularly suited where the device is used in microgravity environments, there may comprise a harness attachable to the first member for securing the user to the first member. There, the harness better ensures the user is located in the correct position whilst using the device, and would help prevent the user from moving off from the device where it is used in microgravity environments.

Viewed from a second aspect there is provided an assembly comprising the device according to the first aspect, and a support member comprising a first end which is attached to the device, and a second end for attaching the assembly to a surface. The assembly therefore allows the device to be attached to a surface of a larger component/structure, such as an aircraft (including spacecraft such as the International Space Station).

In some embodiments, the assembly may further comprise at least one first dampening member, wherein the device is attached to the first end of the support member via the at least one first dampening member.

The assembly in some embodiments may further comprise at least one second dampening member, wherein the support member comprises a pair of support legs which are connected to each other via the least one second dampening member.

In the above embodiments, each dampening member is configured to reduce residual vibrations and movement in the device from being transmitted to the surface to which the device is ultimately attached. This makes the use of such dampening members in the assembly particularly advantageous in situations where the device is used on aircraft including spacecraft, where such vibrations and movement being transmitted thereto is undesirable. Each dampening member may take a plurality of different forms, however in one embodiment each dampening member may comprise a wire rope isolator. Such a wire rope isolator typically comprises a pair of plates which are connected via a stiff wire rope (itself typically formed of a series of braided wire cables), and descriptions of existing wire rope isolators, such as those described in U.S. Pat. No. 5,549,285, are herein incorporated by reference.

In some embodiments, the assembly may further comprise at least one third dampening member attached to the second end of the support member such that the assembly is attachable to the surface via the at least one third dampening member. In some embodiments, each third dampening member comprises a wire rope isolator, which is optionally encased in an elastomeric substance for increasing the stiffness of the wire rope isolator. As with the first and second dampening members, each third dampening member is configured to reduce residual vibrations and movement in the device being transmitted to the surface to which the device is ultimately attached.

Viewed from a third aspect, there is provided an assembly comprising the device from the first aspect, or the assembly from the second aspect, further comprising a pole extending from the first member for straddling by a user in a seated position on the first member. In such assemblies, the pole therefore provides better support for the user to perform seated exercises on the device.

Viewed from a fourth aspect, there is provided a vehicle comprising the assembly according to the second or third aspects, wherein the surface is a floor of the vehicle, and the assembly is attached to the floor. In some embodiments, the vehicle may be an aircraft, or in some more specific embodiments a spacecraft.

BRIEF DESCRIPTION OF THE DRAWINGS

Aspects of the disclosure will now be described, by way of example only, with reference to the accompanying figures in which.

Figure 1A:
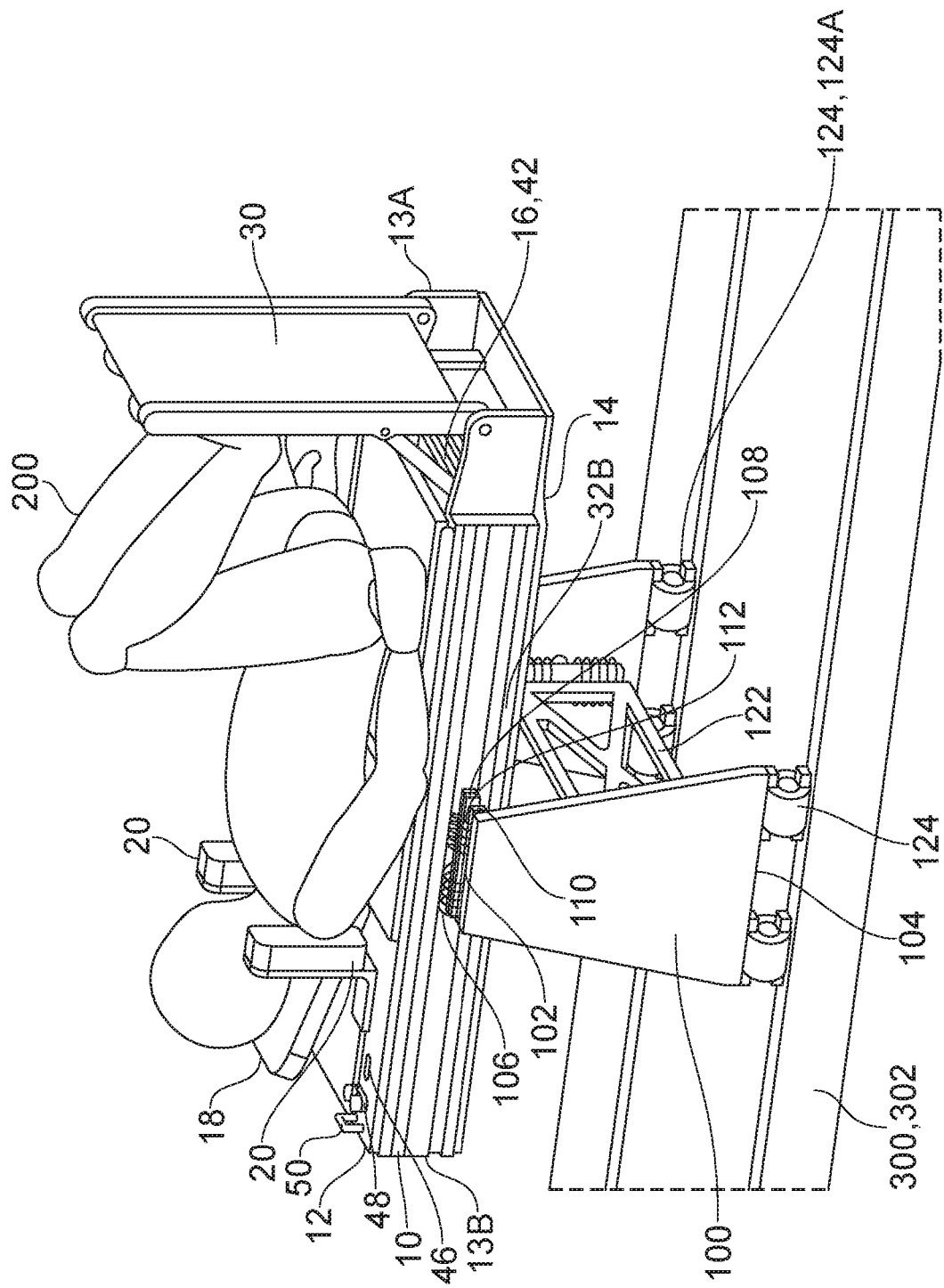
FIG. 1A shows a first perspective view of an embodiment of device in a first position attached to an assembly which is itself attached to a surface of a vehicle.

While the present teachings are susceptible to various modifications and alternative forms, specific embodiments are shown by way of example in the drawings and are herein described in detail. It should be understood, however, that drawings and detailed description thereto are not intended to limit the scope to the particular form disclosed, but on the contrary, the scope is to cover all modifications, equivalents and alternatives falling within the spirit and scope defined by the appended claims.

DETAILED DESCRIPTION

As used in this specification, the words "comprises", "comprising", and similar words, are not to be interpreted in an exclusive or exhaustive sense. In other words, they are intended to mean "including, but not limited to".

It will be recognized that the features of the aspects of embodiments described herein can conveniently and interchangeably be used in any suitable combination. It will also be recognized that the disclosure covers not only individual embodiments but also combinations of the embodiments that have been discussed herein.

The present teaching relates generally to a device for use in microgravity environments.

With reference to the Figures there is shown a device 10, in particular an exercise device, which is suited for use in microgravity environments. The device 10 comprises a first member 12 for supporting a user 200, and a second member 14, attached to the first member 12, comprising a counterbalance portion 16. The first member 12 and the second member 14 are each moveable, and operable to slide with respect to each other in opposite directions, between a first position shown in FIGS. 1A; 1B; 3A and 3G and a second position shown in FIGS. 2 and 3D.

During use of the device, the user 200 rests on their back on the first member 12, and then applies a force on the device 10 to slide the first and second members 12;14 cyclically between the first positions and the second positions. A cycle of such movement is shown in FIGS. 3A-3G.

Figure 1B:
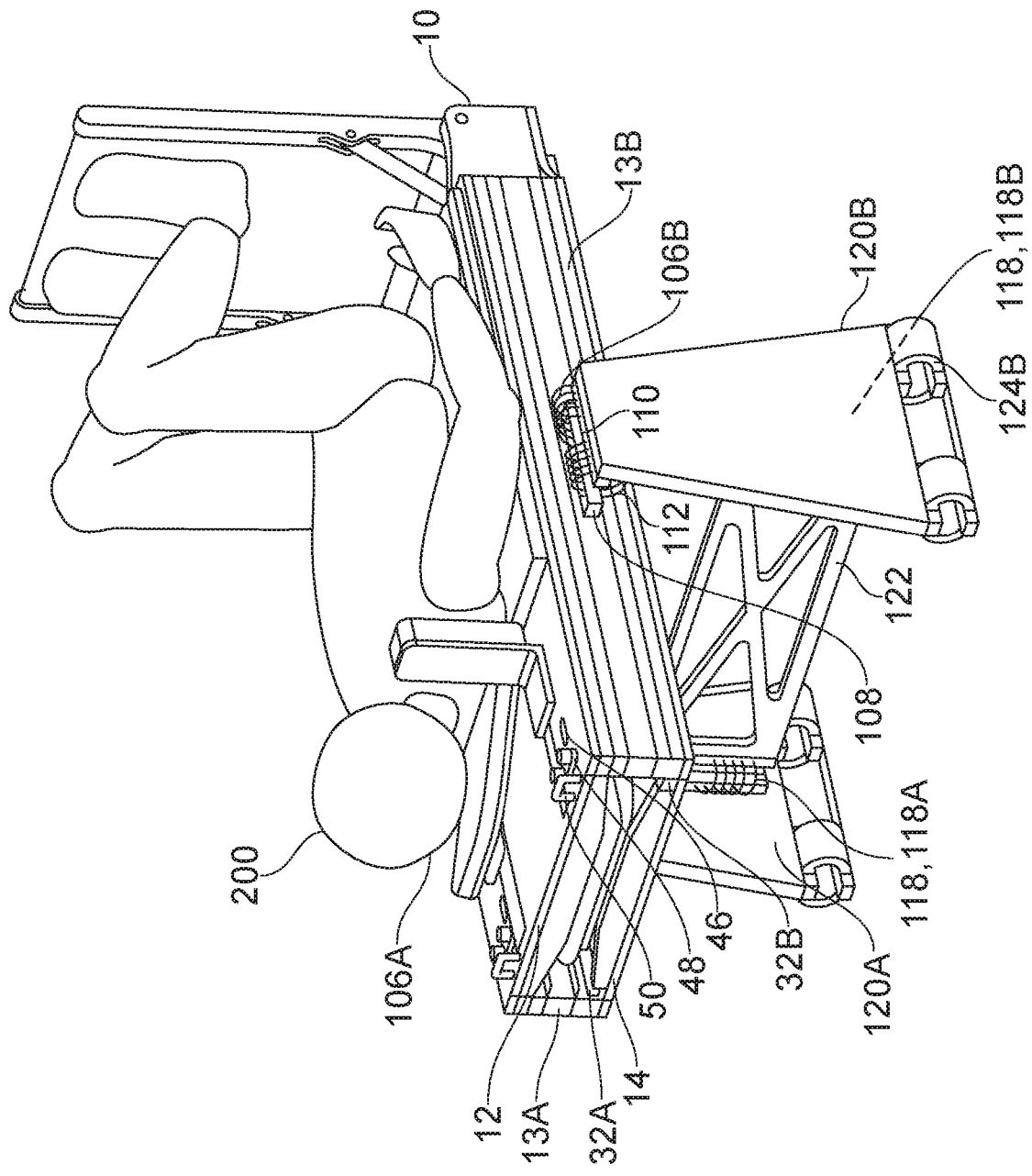
FIG. 1B shows a second perspective view of an embodiment of device in a first position attached to an assembly.
Figure 2:
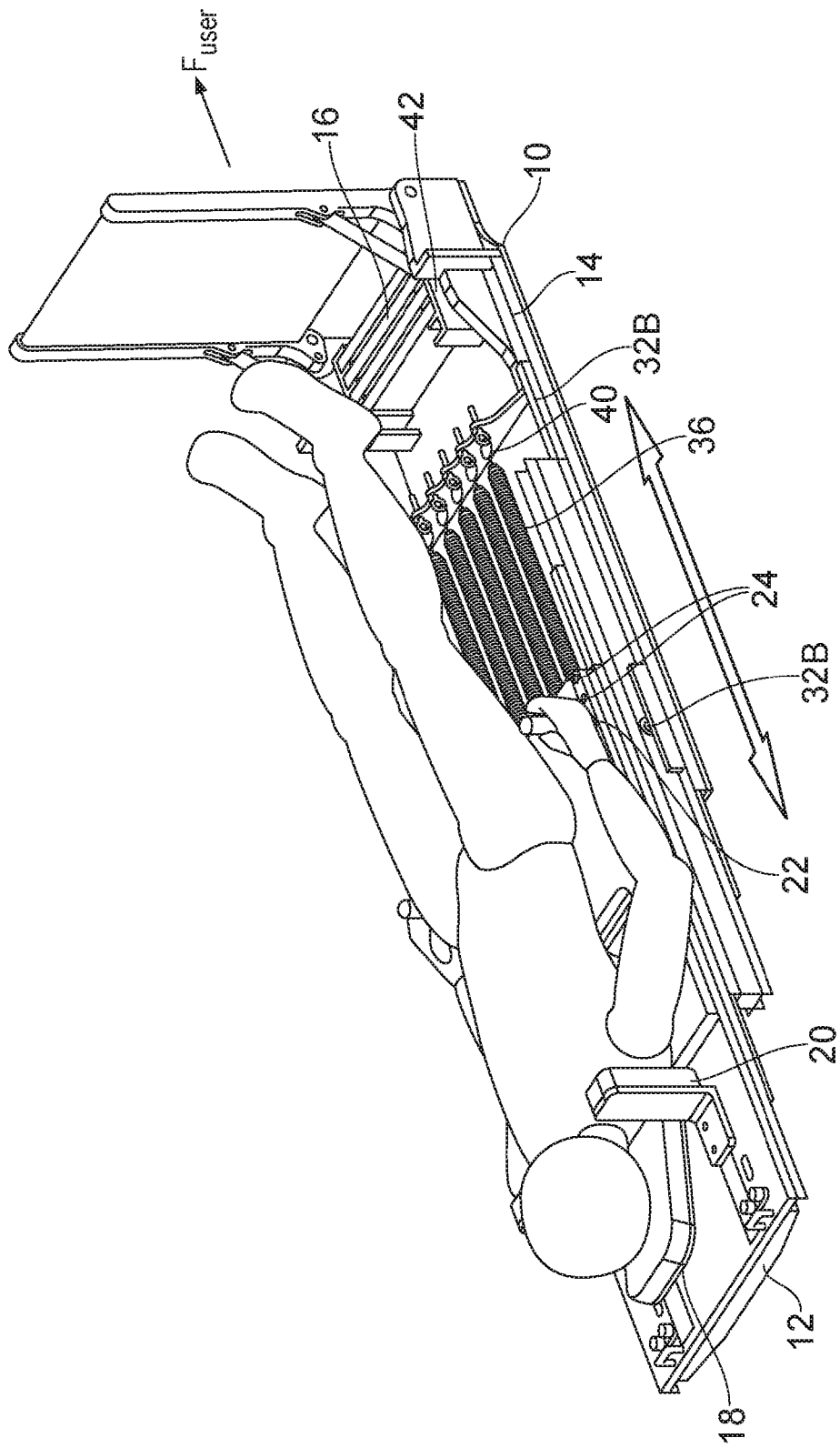
FIG. 2 shows a perspective view of an embodiment of device in a second position.
Figure 3A:
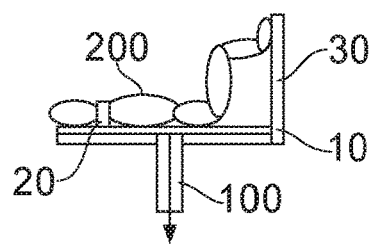
FIGS. 3A-3G show schematic views of a user operating an embodiment of device, attached to an assembly, from a first position to a second position, and then from the second position back to the first position.
Figure 3B:
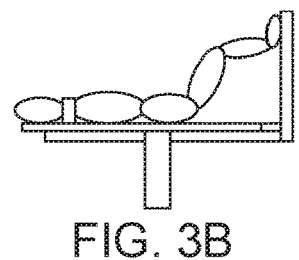
Figure 3C:
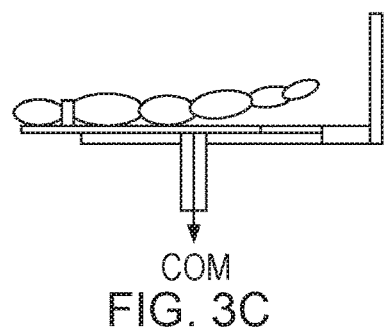
Figure 3D:
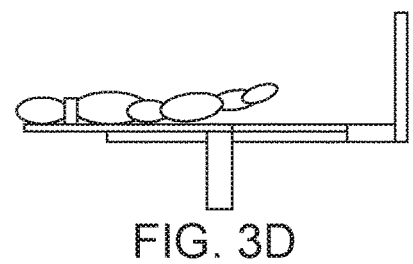
Figure 3E:
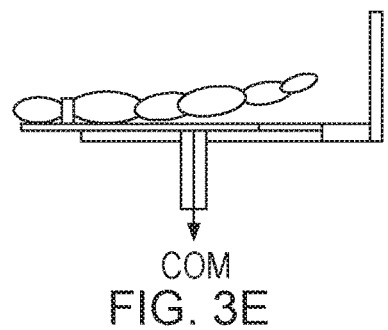
Figure 3F:
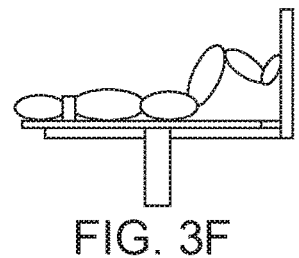
Figure 3G:
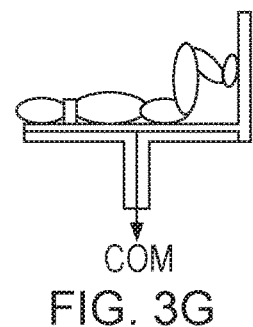

The structure of the device 10 is shown best with reference to FIGS. 1A, 1B and 2. In that embodiment of device 10, the first member 12 is shown as comprising a headrest 18 for supporting a head of the user 200. In some embodiments, the orientation of the headrest with respect to the horizontal may be adjusted. In some embodiments, the first member comprises at least one shoulder pad 20. In the embodiment shown in FIG. 1A, there is provided a first shoulder pad 20 positioned on a first side of the headrest 18, and a second head support 20 positioned on a second side of the headrest 18 opposite the first side. In some embodiments, each shoulder pad 20 may be moveable to a plurality of different positions with respect to the rest of the first member 12, such to allow the device 10 to be better set up for users of different heights. In some embodiments, the first member 12 may comprise at least one handle 22 for gripping by the user 200. In such embodiments, each handle may be moveable between a plurality of different positions with respect to the rest of the first member 12, as shown in the embodiment of device 10 in FIG. 2 where each handle 22 can be inserted into one of a series of holes 24 located in the first member 12.

Figure 4:
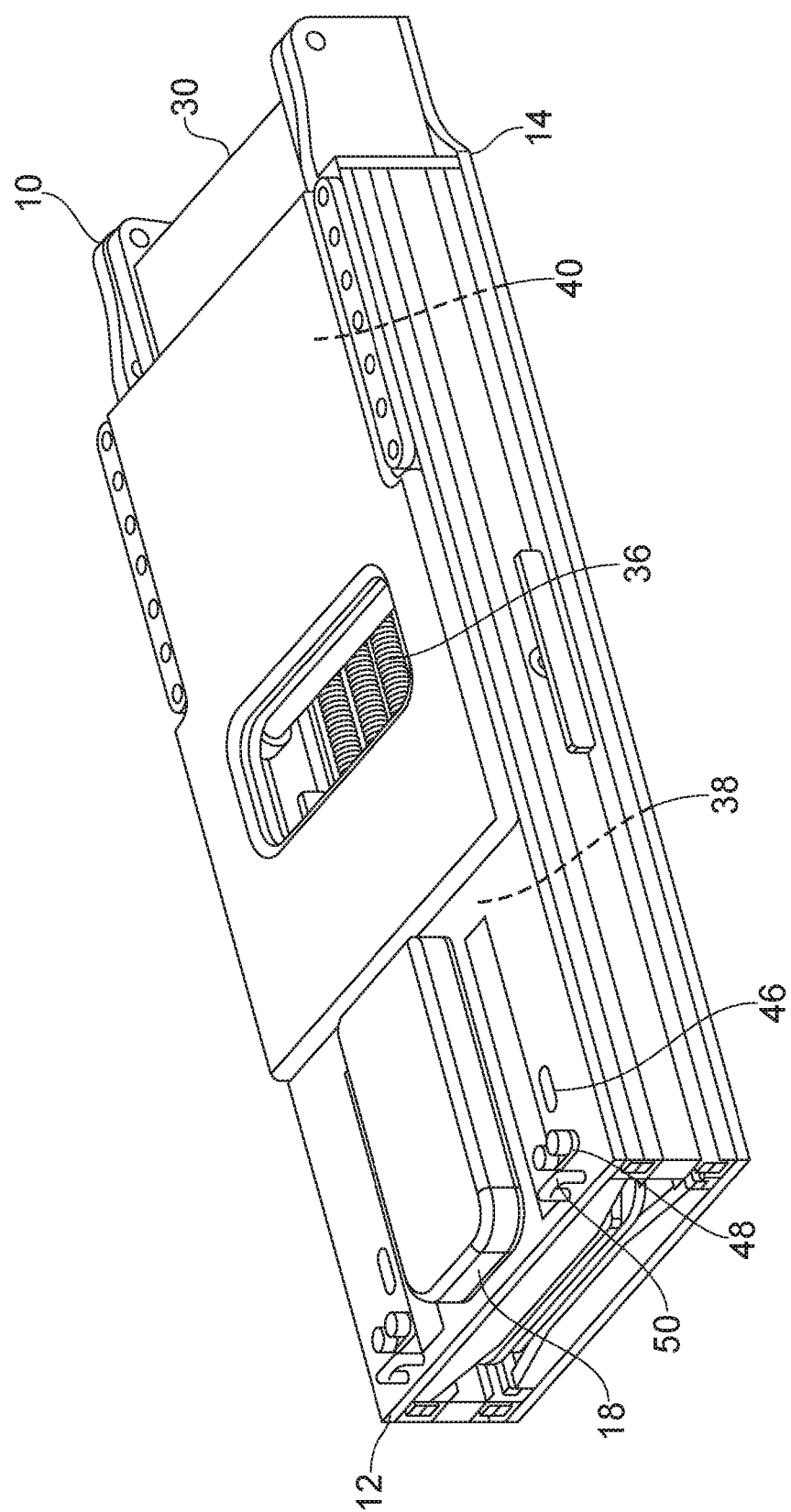
FIG. 4 shows a perspective view of an embodiment of device in a first position, wherein a footplate from the device is shown in a collapsed position.

In relation to the second member 14, in some embodiments the second member 14 comprises a footplate 30. The footplate 30 can be configured to act as a surface from which the user can push against during use of the device 10 to push the first and second members 12;14 toward the second position from the first position. In some embodiments, the footplate may extend in a direction that is substantially perpendicular to the first and second members. In that way, the forces exerted on the footplate 30 by the user 200 are substantially parallel to the direction of motion of the first and second members between the first and second positons. To reduce the space taken up by the device 10 when it is not in use, in some embodiments the footplate 30 may be moveable between an erected position (as shown in FIG. 1A) and a collapsed position (as shown best in FIG. 4).

To control the movement of the first member 12 in relation to the second member 14, the device may comprise at least one rack and pinion 32 for controlling the sliding movement of the first and second members. In the embodiments of device shown in the Figures, the at least one rack and pinion comprise one rack and pinion 32A adjacent a first side 13A of the first and second members, and a second rack and pinion 32B adjacent a second side 13B of the first and second members opposite the first side 13A. In that way, the first member 12 and the second member 14 are constrained to slide with respect to each other about a single axis of movement. In the embodiments shown in the Figures, the axis of movement is substantially parallel to the orientation of the user 200 laying down on the device 10 when the device is in use.

In some embodiments, the device 10 may comprise at least one biasing means 36 for biasing the first member 12 and the second member 14 from the second position towards the first position. In the embodiments shown in the Figures, the biasing means 36 comprises a spring, such as a helical spring. A first end 38 of each biasing means 36 is attached to the first member 12, and a second end 40 opposite the first end 38 attached to the second member 14. In some embodiments, the at least one basing means 38 comprises a plurality of biasing means, which as shown in the embodiments of device 10 shown in the Figures may be distributed across a width of the second member 14. In that way, the loadings exerted through the device 10 as a whole, and also through the plurality of biasing means 36, can be more evenly distributed across the device 10.

The biasing means 36, as well as providing a restorative force for moving the first member 12 and second member 14 from the second position towards the first position, provide a resistive force against the force provided by the user 200 to move the first and second members 12;14 from the first position to the second position. In this way, via appropriate selection of the biasing means, an appropriate resistive force can be generated such to provide the required workout to the user 200.

The configuration of the device 10 is preferably such that that between the first position and second position for the first and second members 12;14, the combined center of mass (COM) of the device 10 and its user 200 remains substantially fixed. The operation of the device through a cycle of motion between the first and second positions is best illustrated in FIG. 3A-3G, where the center of mass (COM)

for the device 10 remains substantially fixed as the first member 12 and the second member 14 move. In practice, the combined center of mass of the device 10 and its user 200 will depend on the mass of the user 200 located on the device 10. To compensate for the variance in user mass, in some embodiments the mass of the counterbalance portion 16 may be variable for balancing the mass of the first member 12 and the user 200 with the mass of the second member 14. In the embodiment of device 10 shown in the Figures, the counterbalance portion 16 comprises a rack 42 for storing separate masses. In some embodiments, the rack 42 may be positioned underneath the footplate 30.

The device 10 in some embodiments may be used as part of an assembly comprising the device 10, and a support member 100 comprising a first end 102 which is attached to the device, and a second end 104 for attaching the assembly to a surface 302. Such an assembly is shown best in FIG. 1A. In the embodiment shown in FIG. 1A, the surface 302 is a floor of a vehicle 300, and the assembly is attached to the floor 302. The vehicle 300 may be any vehicle which might require the use of the device on-board, for instance an aircraft.

At least one dampening member 106 may be provided on the assembly, wherein the device 10 is attached to the first end 102 of the support member 100 via the at least one first dampening member 106. In some embodiments, the first dampening member 106 may comprise a wire rope isolator. In such embodiments, the wire rope isolator comprises a first plate member 108 attached to the device 10, and a second plate member 110 attached to the first end 102 of the support member. The first and second plate members are connected via a stiff wire rope 112 (itself typically formed of a series of braided wire cables), which is shown in FIG. 1A as being helically wound through each of the first and second plate members 108;110.

The functioning of the first dampening member 106 is to reduce the transmission of residual vibrations and movement generated through use of the device to the surface 302 of the vehicle 300. In some embodiments, the assembly may comprise a first dampening member 106A for connecting the first side 13A of the first and second members to the support member 100, and an additional first dampening member 106B for connecting the second side 13B of the first and second members to the support member 100.

The assembly in some embodiments may comprise at least one second dampening member 118, wherein the support member 100 comprises a pair of support legs 120 which are connected to each other via the least one second dampening member 118. In such embodiments, the pair of support legs 120 may comprise a first support leg 120A for connecting to the first side 13A of the first and second members via the first dampening member 106A, and a second support leg 120B for connecting to the second side 13B of the first and second members via the additional first dampening member 106B. Like the first dampening member 106, the functioning of the second dampening member 118 is to reduce the transmission of residual vibrations and movement generated through use of the device to the surface 302 of the vehicle 300.

In some embodiments, the second dampening member 118 may comprise a wire rope isolator. In such embodiments, and where the support member 100 comprises a pair of support legs 120 and a pair of second dampening members 118A;118B, each wire rope isolator may comprises a first plate member attached to a support leg 120, and a second plate member attached to a span 122 which extends between the two support legs 120A;120B (and underneath the first member 12 and second member 14). In some embodiments, the span 122 is perpendicular to the pair of support legs 120. The first and second plate members for each wire rope isolator are connected via a stiff wire rope (itself typically formed of a series of braided wire cables), which is shown in FIG. 1B as being helically wound through each of the first and second plate members.

The assembly may be provided with at least one third dampening member 124 attached to the second end 104 of the support member 100 such that the assembly is attachable to the surface 300 via the at least one third dampening member 124. In embodiments comprising the pair of support legs 120A;120B, one third dampening member 124A may be attached to the first support leg 120A, and another third dampening member 124B attached to the second support leg 120B. In some embodiments, each third dampening member 124 may comprise a wire rope isolator, which is optionally encased in an elastomeric substance for further increasing the stiffness of the wire rope isolator.

Together, the first, second and third dampening members act to reduce residual vibrations and movement generated through use of the device 10 by user 200 as they move the first member and second members cyclically between the first and second positions (such movement is shown in FIGS. 3A-3G where the user is laying down on their back) from being transmitted to the surface 302 of the vehicle 300.

The above therefore describes a device, particularly an exercise device, and an assembly comprising such a device, which mitigates any created forces and vibrations from the device being transmitted to its surroundings; and which describes a vehicle comprising such a device or an assembly.

With reference to FIGS. 3A-3G, a primary use of the device is for a user to move the first member 12 and second member 14 cyclically between the first and second positions whilst they are laying on their back. During such movement, the user pushes against the footplate 30 using their feet to push the first and second members 12;14 toward the second position.

An alternative operation of the device is shown in FIGS. 6A-6E which shows the user operating the device 10 in a seated position—sat on an end of the first member 12. In that operation, an L-shaped bracket 400 may be attached to the device 10 whereby a first end 402 of the L-shaped bracket is attached to the device 10, and a second free end 404 of the L-shaped bracket 400 comprises a rope receiving means, such as a pulley (not shown in FIGS. 6A-6E). A rope 406 is provided which is attached at a first end to the first member 12. From the first end, the rope 406 passes through an aperture 46 in the first member 12, then through a pair of guide rollers 48 from the first member 12, through a hoop 50 in the first member 12, through the rope receiving means located at the second end 404 of the L-shaped bracket 400, to a second end of the rope for gripping by the user.

During such operation, as the user 200 pulls on the second on the rope, the pulling force creates a force which drives the first member 12 to which the rope 406 is attached in a direction from the first position to the second position. Since the first member 12 is attached to the second member 14 by the biasing means 36, the pulling force from the user moves both the first and second members from the first position towards the second position (as shown in the movement from FIGS. 6A-6C). Upon the release of the pulling force from the rope 406, the action of the biasing means 36 reverts the first and second members 12;14 back towards the first position (as shown in the movement from FIGS. 6C-6E).

Figure 6A:
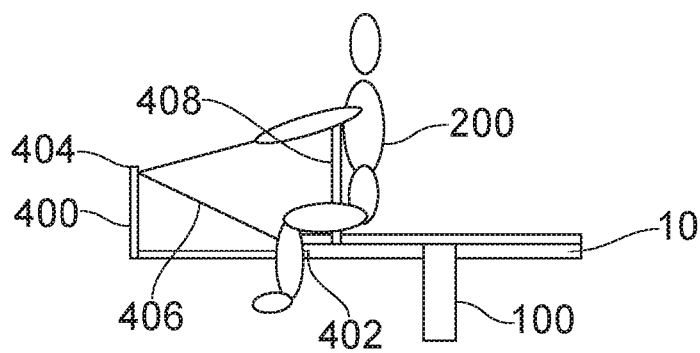
FIGS. 6A-6E show schematic views of a user operating an embodiment of device, attached to an assembly, from a first position to a second position, and then from the second position back to the first position.
Figure 6B:
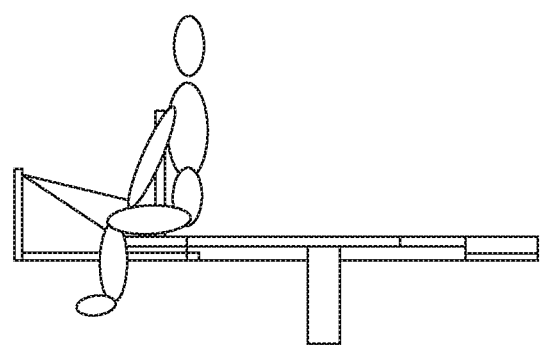
Figure 6C:
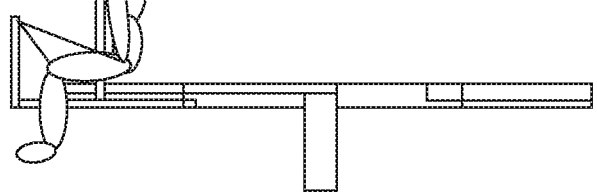
Figure 6D:
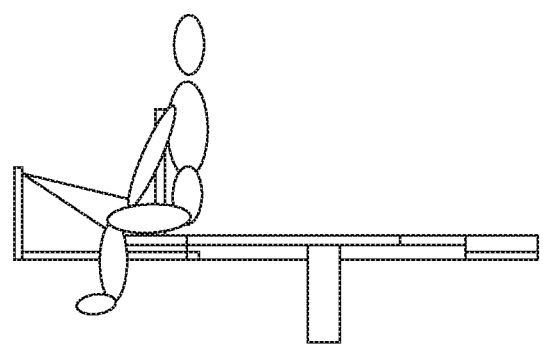
Figure 6E:
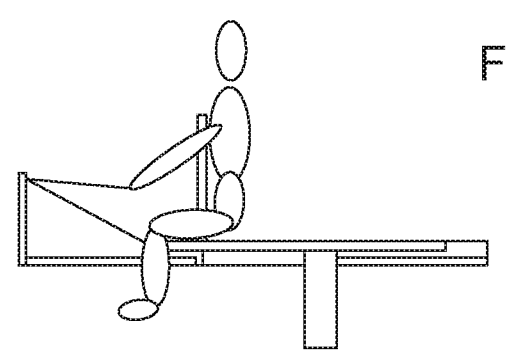
Figure 7A:
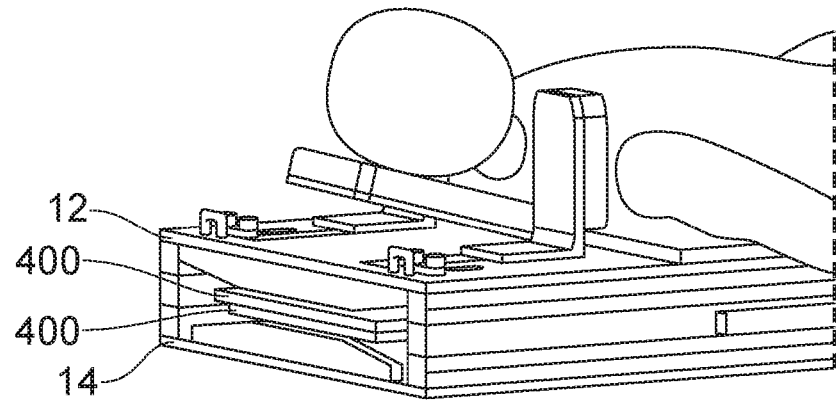
FIGS. 7A-7C show schematic views of a portion of an embodiment of device comprising at least one bracket attached to the device.
Figure 7B:
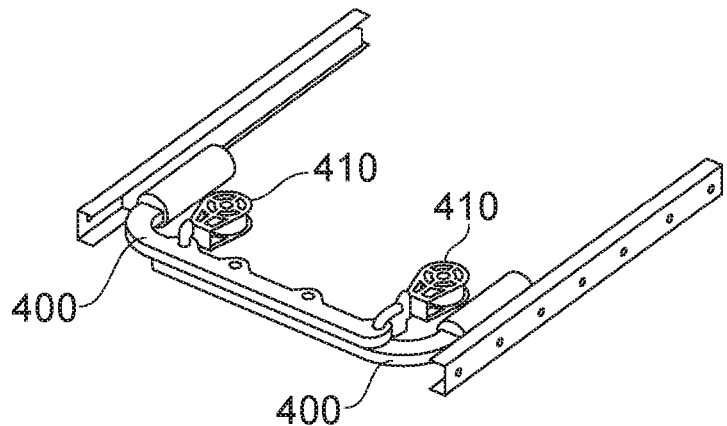
Figure 7C:
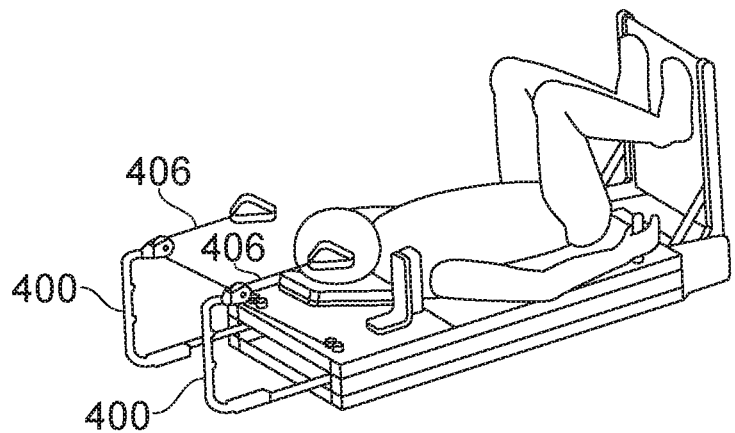

In some embodiments, each bracket 400 shown in FIGS. 6A-6C may be moveable between a first stowed position in which the bracket 400 is located between the first and second members 12;14, and a second erected position where the bracket 400 extends out from between the first and second members 12;14, as shown in FIGS. 7A-7C. In such embodiments, each bracket may comprise the rope receiving means 410, such as a pulley, for receiving the rope 406 that is operable to be gripped by the user. In some embodiments, each bracket 400 may be configured to move between the first stowed position and the second erected position by a rotational movement and a sliding movement, as shown with reference to FIG. 7A which shows each bracket in the stowed positon, and FIG. 7C which shows the brackets in the erected position. To allow a user to exercise with both arms simultaneously, in some embodiments, there may be provided two brackets—i.e. one bracket for each arm of the user.

To assist with the user's comfort and correct placement on the device 10 during the operation of the device and assembly shown in FIGS. 6A-6E, the assembly in such embodiments may comprise a pole 408 extending upwards from the first member 12 for straddling by the user 200 when in a seated position on the first member 12. The pole 408 in some embodiments is preferably configured to provide support for the user's chest area as the device 10 is used. In some embodiments, the pole 408 may comprise a maximum length of between 400 mm-700 mm.

It will be appreciated that various other modifications can be made to the systems and method described herein.

For instance, in some embodiments, the device may comprise at least one sensor (not shown in the Figures). In such embodiments, each sensor may be used to generate information concerning a property of the device, or the user which is using the device. In some embodiments, the property may comprise a stress, strain, velocity, acceleration, position, or angle. Exemplary sensors include, but are not limited to, at least one of an accelerometer, a strain gauge, a pressure sensor or an optical sensor.

Figure 5A:
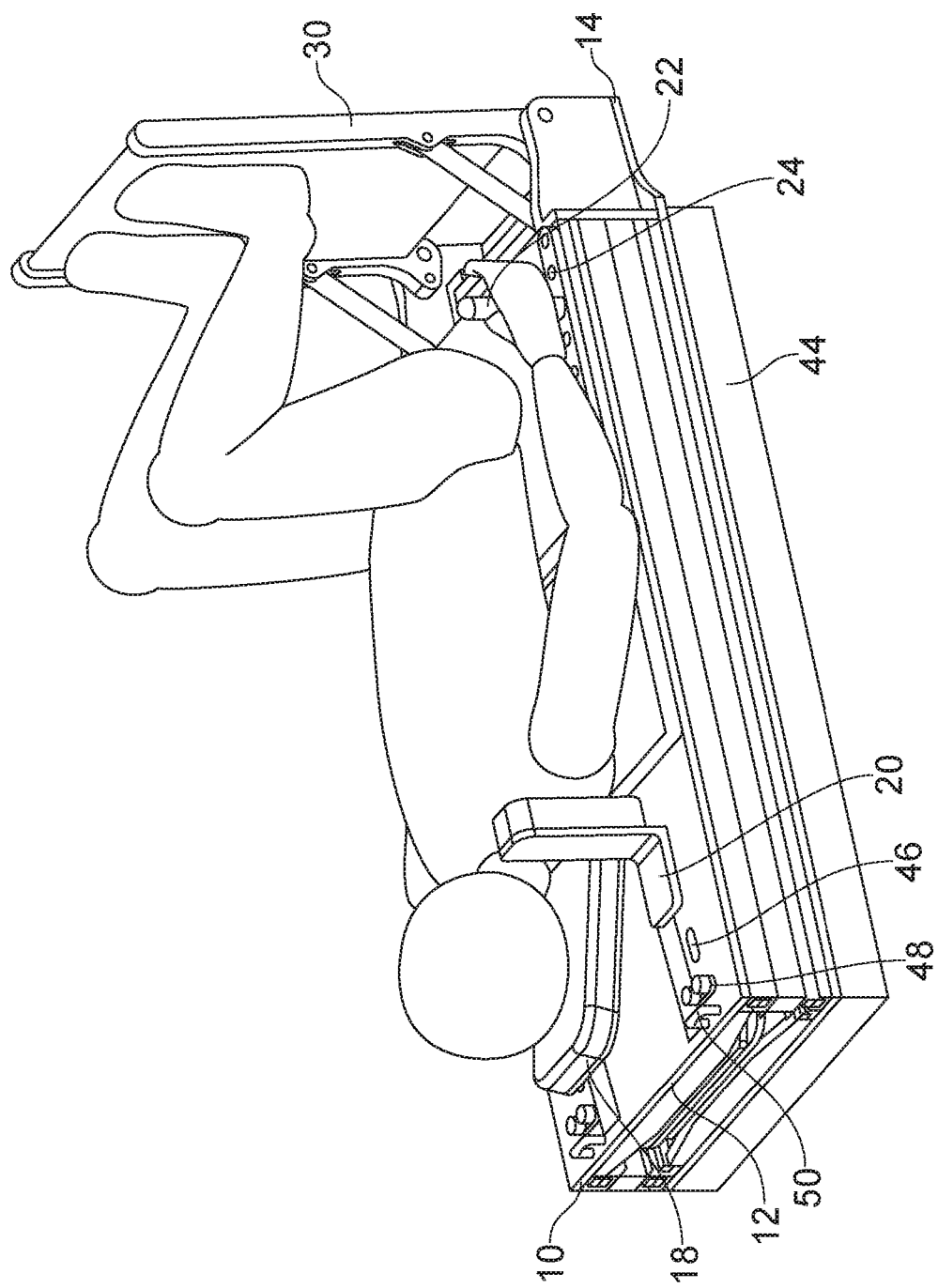
FIG. 5A shows a perspective view of an embodiment of device in a first position.
Figure 5B:
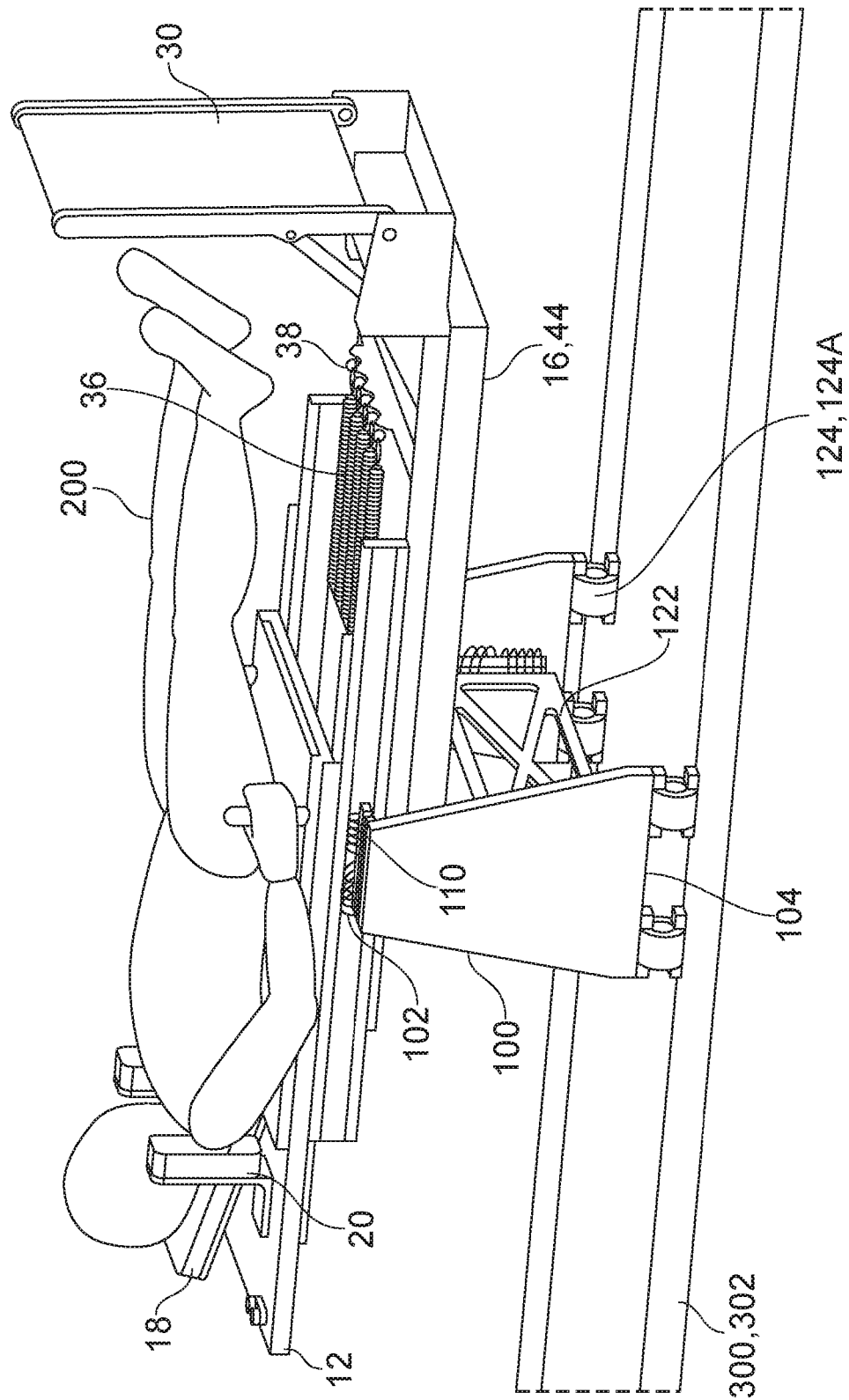
FIG. 5B shows a perspective view of an embodiment of device in a second position attached to an assembly which is itself attached to a surface of a vehicle.

In some embodiments, the counterbalance portion 16 may comprise a tank 44 containing fluid, such as water, as shown in FIGS. 5A and 5B. In these embodiments, the tank 44 may be located underneath the second member 14. Such embodiments are particularly suited where the device 10 is used in a location where space is at a premium, such as the ISS. There, the tank 44 can be used to temporarily store fluid which may be needed elsewhere at a later time.

In some embodiments, to further suit the device for use in microgravity environments, the device may comprise a harness attachable to the first member 12 for securing the user to the first member 12. There, the harness better ensures the user is located in the correct position whilst using the device 10, and would help prevent the user from moving off from the device 10 where it is used in microgravity environments.

In terms of the principal dimensions of the device 10, it will be appreciated that these may vary depending on the exact specification for the device. However, in some embodiments, the device may have a maximum width of between 500 mm and 700 mm, and a maximum height of between 150 and 300 mm when in the footplate is in a collapsed position. In some embodiments, the maximum length of the device may be between 1200 mm and 1600 mm when the first and second members are in the first position. In a particular embodiment, each of the first member 12 and the second member 14 may move between the first position and the second position by approximately 550 mm (in another embodiment by 500 mm-600 mm), such that the first and second members 12;14 collectively move by 1100 mm.

It will also be appreciated the devices and assemblies described herein, which have been described in some embodiments as being particularly suited for use in microgravity environments (where the transfer of the undue forces and vibrations is particularly undesirable), may be used in any other environment, such as terrestrial environments. In some embodiments, the device may be for use as an exercise device for performing at least one of pre-flight and post-flight exercises.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the spirit and scope of the claimed invention.

Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A device for use in microgravity environments, the device comprising:
   a first member for supporting a user;
   a second member, attached to the first member, comprising a counterbalance portion;
   wherein the first member and the second member are each moveable, and operable to slide with respect to each other in opposite directions, between a first position and a second position, and
   wherein a mass of the counterbalance portion is variable for balancing a mass of the first member and a user with a mass of the second member.

2. The device according to claim 1, wherein the device is operable such that between the first position and the second position, a combined center of mass of the device and a user remains substantially fixed.

3. The device according to claim 1, wherein the first member and the second member are operable to slide with respect to each other about a single axis of movement.

4. The device according to claim 1, wherein the counterbalance portion comprises a rack for storing separate masses.

5. The device according to claim 1, further comprising at least one rack and pinion for controlling the sliding movement of the first member and the second member.

6. The device according to claim 1, further comprising at least one biasing means for biasing the first member and the second member from the second position towards the first position.

7. The device according to claim 6, wherein the at least one basing means comprises a plurality of biasing means.

8. The device according to claim 1, wherein the first member comprises a headrest.

9. The device according to claim 1, wherein the first member comprises at least one shoulder pad.

10. The device according to claim 1, wherein the first member comprises at least one handle for gripping by the user.

11. The device according to claim 1, wherein the second member comprises a footplate that is moveable between an erected position and a collapsed position.

12. The device according to claim 1, further comprising at least one sensor.

13. The device according to claim 12, wherein the at least one sensor is an accelerometer.

14. The device according to claim 1, further comprising at least one bracket attached to the device, wherein each of the at least one bracket comprises a rope receiving means, wherein each of the at least one bracket is moveable between a first stowed position in which each of the at least one bracket is located between the first member and the second member, and a second erected position where each of the at least one bracket extends out from between the first member and the second member.

15. The device according to claim 14, wherein each of the at least one bracket is configured to move between the first stowed position and the second erected position by a rotational movement and a sliding movement.

16. An assembly comprising the device according to claim 1, and a support member comprising a first end which is attached to the device, and a second end for attaching the assembly to a surface.

17. The assembly according to claim 16, further comprising at least one first dampening member, wherein the device is attached to the first end of the support member via the at least one first dampening member.

18. The assembly according to claim 16, further comprising at least one second dampening member, wherein the support member comprises a pair of support legs which are connected to each other via the least one second dampening member.

19. The assembly according to claim 18, further comprising at least one third dampening member attached to the second end of the support member such that the assembly is attachable to the surface via the at least one third dampening member.

20. An assembly comprising the device according to claim 1, further comprising a pole extending upwards from the first member for straddling by a user in a seated position on the first member.

21. An assembly comprising the device according to claim 1, further comprising a harness attachable to the first member for securing a user to the first member.

22. A vehicle comprising the assembly according to claim 16, wherein the surface is a floor of the vehicle, and the assembly is attached to the floor.

23. The vehicle according to claim 22, wherein the vehicle is an aircraft.

* * * * *